United States Patent [19]

Trifon

[11] Patent Number: 5,064,688
[45] Date of Patent: Nov. 12, 1991

[54] AUTOMOTIVE TOP COAT RESTORING COMPOSITION AND PROCESS

[76] Inventor: George Trifon, 743 Ridgeview Dr., Lilburn, Ga. 30247

[21] Appl. No.: 587,098

[22] Filed: Sep. 24, 1990

[51] Int. Cl.$^5$ .............................................. B05D 35/00
[52] U.S. Cl. .................................. 427/140; 427/142; 427/154; 427/156; 427/387; 427/388.1; 427/388.2
[58] Field of Search .............. 427/154, 140, 156, 421, 427/429, 387, 388.2, 388.1, 142; 106/287.14

[56] References Cited

U.S. PATENT DOCUMENTS

| | | | |
|---|---|---|---|
| 2,702,276 | 2/1955 | Green | 106/287.14 |
| 2,866,711 | 12/1958 | Hart | 106/287.14 |
| 3,341,338 | 12/1987 | Pater et al. | 106/287.14 |
| 4,263,051 | 4/1981 | Crawford et al. | 106/287.14 |
| 4,844,826 | 7/1989 | Schaefer et al. | 106/287.14 |

*Primary Examiner*—Janyce Bell

[57] ABSTRACT

The present invention discloses a novel composition and process for restoring the polymeric top coat applied to automobiles. Modern automobiles have a clear high gloss top coat applied to the painted surfaces. These top coats have a tendency to pit either because of environmental factors like acid rain, or impact with objects such as stones thrown from the road. The compositions and process described provide an efficient cost effective method to restore the pitted surface of the top coat.

5 Claims, No Drawings

AUTOMOTIVE TOP COAT RESTORING COMPOSITION AND PROCESS

BACKGROUND OF THE INVENTION:

(1) Field of Invention

The present invention relates to a novel composition and process for restoring the polymeric top coat applied to painted surfaces, most importantly on automobiles. Top coat is also referred to as clear coat by some manufacturers.

(2) Description of the Arts and Practices

The appearance of the painted surface of automobiles is a critical factor in determining of a vehicles value. Consequently, the preservation of the appearance of the painted surface is an important factor in retaining resale value or in making the initial sale. Painted surfaces have a tendency to oxidize and dull with time and become unattractive. This degradation of the appearance of the painted surface has been accelerated in areas of the country were environmental factors such as acid rain are prevalent. The acidity is corrosive to the painted surface and causes pits. These pits are local areas in which the clear coat's film continuity have been disrupted or etched. These spots can be quite unsightly and impact in a negative manner on the value of the automobile. Even new automobiles can experience a degradation of the painted surface It is not uncommon for a car to remain on the lot for several months and experience degradation.

One method of restoring the appearance the painted surface are known U.S. Pat. No. 4,600,436 discloses a typical wax formulation. While the intent of the wax is to provide a hydrophobic coating to the surface of the auto, it does little to alter the structure of either the paint or the top coat.

Additionally, U.S. Pat. No. 4,613,345 to teaches that abrasives can be added to polish formulations to increase the effectiveness of the polish. While the abrasive is effective on those painted surfaces were no top coat is applied, they cause damage to the top coat and their use is to be avoided on top coated autos. The abrasive physically removes the upper layers of the paint and exposes a lower layer which has not been degraded to the same extent. The polish also leaves a temporary gloss to the painted surface.

In recent years there has been an increasing trend to apply an automotive top coat formulations to painted automotive surfaces. This gives a durable gloss to the auto. This polymeric coating provides good appearance but is also subject to chemical as well as physical degradation. The environmental conditions of acid rain and physical trauma to the polymer surface causes the formation of pits. These pits are even harder to treat than the untreated painted surface. The reason for this is that once the top coats surface is disrupted, it must be sanded and removed and then uniformly reapplied. This sanding and reapplication of the top coat is very labor intensive and consequently very costly.

SUMMARY OF THE INVENTION:

The present invention discloses a novel composition and process for restoring the top coat applied to automobiles. Modern automobiles have a clear high gloss top coat applied to the painted surfaces These top coats have a tendency to pit either because of environmental factors like acid rain, or impact with objects such as stones thrown from the road. The compositions and process described provide an efficient cost effective method to restore the pitted surface of the top coat.

OBJECT OF THE INVENTION

It is accordingly an object of the present invention to provide a composition for the treatment of painted surfaces to which have been applied a top coat. The process involves a polymerization reaction of a silanic hydrogen containing silicone polymer on the surface of the painted surface. The polymerization fills the pitted surface making a clear elastomeric surface which restores the appearance of the top coat.

It is a further object of the invention to provide a process for restoring a painted surface to which has been applied a polymeric top coat.

It is still further and object to provide a polymeric coating to the painted surface which is resistant to chemical as well as physical degradation. The restorative process results in a more durable coating than the top coat as applied.

Still other objects and advantages will readily present themselves to one skilled in the art upon reference to the following specification and claims.

DESCRIPTION OF THE PREFERRED EMBODIMENTS

According to the invention it had been discovered that a stable polymeric composition can be prepared which is suitable for restoring the top coat applied to painted surfaces. The compositions of the present invention contain p (a) a silanic hydrogen containing silicone polymer conforming to the following structure;

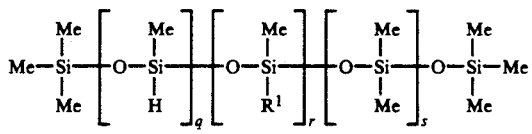

wherein;

$R^1$ is selected from lower alkyl having one to eight carbon atoms and phenyl;

q is an integer from 1 to 1,000;

r and s are independently integers from 0 to 1,000;

Me is methyl;

(b) an organic solvent selected from mineral spirits, kerosene, d limonene and 1,1,1 trichloroethane; and optionally (c) a catalyst containing tin, zirconium and titanium.

The percentage of silanic hydrogen containing polymer may range from 90% to 2% but typically is 40 to 60%.

The percentage of solvent may range from 10% to 98% but typically is 60 to 40%.

The percentage of catalyst may range from 0% to 10% but typically is 1 to 5%.

In a preferred embodiment, the silanic hydrogen containing silicone polymer contains an R1 moiety which is octyl (C8H17) or phenyl. These moieties make the resulting polymer more hydrophobic and consequently more resistant to harsh chemicals.

In another preferred embodiment, the silanic hydrogen containing silicone polymer contains has a viscosity of below 1,000 csp. Such a polymer has a molecular weight below 2,000 MWU and is small enough to penetrate the matrix of the polymeric top coat and once the solvent evaporates polymerize. This polymerization of the silicone which prior to polymerization penetrates the top coat, results in an interlocked polymer matrix were the silicone and top coat overlap. This results in a uniform coat and a durable finish at the overlap point between the silicone and top coat matrix. It will be understood that the event which initiates the polymerization is the evaporation of solvent.

In still another preferred embodiment a catalyst is added to the composition. Once the solvent evaporates, the catalyst will influence the speed of polymerization and the degree of cross link density. High cross link density is desirable for increased durability of the silicone polymer film. Speed of reactivity is desirable for decreasing the time needed to treat each car.

The compositions of the present invention can be applied with a cloth, a brush or a spray applicator. The surface should be clean and dry before application. Once applied the compositions should be allowed a period of 30 minutes to 3 hours to polymerized.

Raw Material Examples

The silanic hydrogen containing silicone compounds are available commercially from Siltech Inc. Norcross Ga and are selected from;

$$\text{Me}-\underset{\underset{\text{Me}}{|}}{\overset{\overset{\text{Me}}{|}}{\text{Si}}}-\left[\text{O}-\underset{\underset{\text{H}}{|}}{\overset{\overset{\text{Me}}{|}}{\text{Si}}}\right]_q-\left[\text{O}-\underset{\underset{R^1}{|}}{\overset{\overset{\text{Me}}{|}}{\text{Si}}}\right]_r-\left[\text{O}-\underset{\underset{\text{Me}}{|}}{\overset{\overset{\text{Me}}{|}}{\text{Si}}}\right]_s-\text{O}-\underset{\underset{\text{Me}}{|}}{\overset{\overset{\text{Me}}{|}}{\text{Si}}}-\text{Me}$$

| Reactant # | q | s | r | $R^1$ |
|---|---|---|---|---|
| 1 | 50 | 50 | 0 | — |
| 2 | 90 | 10 | 0 | — |
| 3 | 10 | 90 | 0 | — |
| 4 | 99 | 1 | 10 | Phenyl |
| 5 | 1 | 99 | 100 | Octyl |
| 6 | 50 | 150 | 10 | Phenyl |
| 7 | 150 | 50 | 0 | — |
| 8 | 100 | 0 | 0 | — |
| 9 | 100 | 1 | 100 | Phenyl |
| 10 | 25 | 25 | 25 | Octyl |
| 11 | 5 | 5 | 5 | Ethyl |
| 12 | 10 | 0 | 10 | Octyl |
| 13 | 100 | 250 | 10 | Phenyl |

Preparation of Compositions

The compositions of the current invention are prepared by adding the specified amount of the specified silicone compound to the specified amount of the specified solvent under good agitation. The specified amount of the specified catalyst is then added where indicated.

EXAMPLE 14

| Silanic Hydrogen Compound Example | /Grams | Solvent Type/Grams | Catalyst Type/Grams |
|---|---|---|---|
| 1 | 100.0 Grams | Mineral Spirits 100.0 Grams | Isopropanol Titinate 2.0 Grams |

EXAMPLE 15

| Silanic Hydrogen Compound Example | /Grams | Solvent Type/Grams | Catalyst Type/Grams |
|---|---|---|---|
| 2 | 50.0 Grams | Mineral Spirits 100.0 Grams | Isopropyl Titinate 2.0 Grams |

EXAMPLE 16

| Silanic Hydrogen Compound Example | /Grams | Solvent Type/Grams | Catalyst Type/Grams |
|---|---|---|---|
| 3 | 100 Grams | Mineral Spirits 100.0 Grams | Isopropyl Titinate 2.0 Grams |

EXAMPLE 17

| Silanic Hydrogen Compound Example | /Grams | Solvent Type/Grams | Catalyst Type/Grams |
|---|---|---|---|
| 4 | 200 Grams | Mineral Spirits 100.0 Grams | Isopropyl Titinate 2.0 Grams |

EXAMPLE 18

| Silanic Hydrogen Compound Example | /Grams | Solvent Type/Grams | Catalyst Type/Grams |
|---|---|---|---|
| 5 | 100 Grams | Mineral Spirits 100.0 Grams | Isopropyl Titinate 2.0 Grams |

EXAMPLE 19

| Silanic Hydrogen Compound Example | /Grams | Solvent Type/Grams | Catalyst Type/Grams |
|---|---|---|---|
| 6 | 100 Grams | Mineral Spirits 100.0 Grams | Isopropyl Titinate 2.0 Grams |

EXAMPLE 20

| Silanic Hydrogen Compound Example | /Grams | Solvent Type/Grams | Catalyst Type/Grams |
|---|---|---|---|
| 7 | 50.0 Grams | Mineral Spirits 100.0 Grams | Tin Oxalate 2.0 Grams |

EXAMPLE 21

| Silanic Hydrogen Compound Example | /Grams | Solvent Type/Grams | Catalyst Type/Grams |
|---|---|---|---|
| 8 | 75.0 Grams | Mineral Spirits 100.0 Grams | Tin Oxalate 2.0 Grams |

EXAMPLE 22

| Silanic Hydrogen Compound Example | /Grams | Solvent Type/Grams | Catalyst Type/Grams |
|---|---|---|---|
| 9 | 150.0 Grams | Mineral Spirits 100.0 Grams | Tin Oxalate 2.0 Grams |

EXAMPLE 23

| Silanic Hydrogen Compound Example | /Grams | Solvent Type/Grams | Catalyst Type/Grams |
|---|---|---|---|
| 10 | 200.0 Grams | Mineral Spirits 100.0 Grams | Tin Oxalate 2.0 Grams |

EXAMPLE 24

| Silanic Hydrogen Compound Example | /Grams | Solvent Type/Grams | Catalyst Type/Grams |
|---|---|---|---|
| 11 | 900.0 Grams | Mineral Spirits 100.0 Grams | Tin Oxalate 2.0 Grams |

EXAMPLE 25

| Silanic Hydrogen Compound Example | /Grams | Solvent Type/Grams | Catalyst Type/Grams |
|---|---|---|---|
| 12 | 100.0 Grams | Mineral Spirits 100.0 Grams | Tin Oxalate 2.0 Grams |

EXAMPLE 26

| Silanic Hydrogen Compound Example | /Grams | Solvent Type/Grams | Catalyst Type/Grams |
|---|---|---|---|
| 13 | 100.0 Grams | Mineral Spirits 100.0 Grams | Isopropyl Titinate 2.0 Grams |

EXAMPLE 27

| Silanic Hydrogen Compound Example | /Grams | Solvent Type/Grams | Catalyst Type/Grams |
|---|---|---|---|
| 1 | 100.0 Grams | 1,1,1 Trichloroethane 100.0 Grams | None |

EXAMPLE 28

| Silanic Hydrogen Compound Example | /Grams | Solvent Type/Grams | Catalyst Type/Grams |
|---|---|---|---|
| 2 | 100.0 Grams | 1,1,1 Trichloro-ethane 100.0 Grams | Zirconium Acetate 1.0 Gram |

EXAMPLE 29

| Silanic Hydrogen Compound Example | /Grams | Solvent Type/Grams | Catalyst Type/Grams |
|---|---|---|---|
| 3 | 100.0 Grams | d limonene 100.0 Grams | Zirconium Acetate 1.0 Gram |

EXAMPLE 30

| Silanic Hydrogen Compound Example | /Grams | Solvent Type/Grams | Catalyst Type/Grams |
|---|---|---|---|
| 4 | 100.0 Grams | d limonene 100.0 Grams | Zirconium Acetate 1.0 Gram |

EXAMPLE 31

| Silanic Hydrogen Compound Example | /Grams | Solvent Type/Grams | Catalyst Type/Grams |
|---|---|---|---|
| 5 | 100.0 Grams | d limonene 100.0 Grams | Zirconium Acetate 0.5 Grams |

EXAMPLE 32

| Silanic Hydrogen Compound Example | /Grams | Solvent Type/Grams | Catalyst Type/Grams |
|---|---|---|---|
| 6 | 100.0 Grams | Kerosene 100.0 Grams | Zirconium Acetate 0.5 Grams |

EXAMPLE 33

| Silanic Hydrogen Compound Example | /Grams | Solvent Type/Grams | Catalyst Type/Grams |
|---|---|---|---|
| 7 | 100.0 Grams | Kerosene 100.0 Grams | Zirconium Acetate # |

EXAMPLE 34

| Silanic Hydrogen Compound Example | /Grams | Solvent Type/Grams | Catalyst Type/Grams |
|---|---|---|---|
| 8 | 100.0 Grams | Kerosene 100.0 Grams | Zirconium Acetate 0.5 Grams |

EXAMPLE 35

| Silanic Hydrogen Compound Example | /Grams | Solvent Type/Grams | Catalyst Type/Grams |
|---|---|---|---|
| 9 | 100.0 Grams | Kerosene 100.0 Grams | Zirconium Acetate 0.5 Grams |

EXAMPLE 36

| Silanic Hydrogen Compound | | Solvent | Catalyst |
|---|---|---|---|
| Example | /Grams | Type/Grams | Type/Grams |
| 10 | 100.0 Grams | d limonene 100.0 Grams | Zirconium Acetate 0.5 Grams |

EXAMPLE 37

| Silanic Hydrogen Compound | | Solvent | Catalyst |
|---|---|---|---|
| Example | /Grams | Type/Grams | Type/Grams |
| 11 | 100.0 Grams | Kerosene 100.0 Grams | Zirconium Acetate 1.0 Gram |

EXAMPLE 38

| Silanic Hydrogen Compound | | Solvent | Catalyst |
|---|---|---|---|
| Example | /Grams | Type/Grams | Type/Grams |
| 12 | 100.0 Grams | Kerosene 100.0 Grams | Zirconium Acetate 1.0 Gram |

EXAMPLE 39

| Silanic Hydrogen Compound | | Solvent | Catalyst |
|---|---|---|---|
| Example | /Grams | Type/Grams | Type/Grams |
| 13 | 100.0 Grams | 1,1,1 Tricholoroethane 100.0 Grams | Zirconium Acetate 0.5 Grams |

Evaluation Procedure

A 1988 Buick was chosen for evaluation. The paint was black and a clear top coat had been applied. The hood had several areas which exhibited pitting. The hood was washed with nonionic detergent and water and allowed to dry. The hood was divided into 12 sections with masking tape. All of the hood with the exception of the square being treated were covered. The following materials were sprayed onto specific squares and allowed to dry undisturbed.

The appearance was rated on a scale of 0–5. A rating of 0 meant no change in appearance, a rating of 5 indicated a "new finish look".

| Composition Example Number | Rating |
|---|---|
| None | 0 |
| 14 | 5 |
| 17 | 4 |
| 18 | 4 |
| 21 | 4 |
| 22 | 4 |
| 25 | 4 |
| 27 | 5 |
| 30 | 5 |
| 35 | 5 |
| 39 | 4 |

As can be seen by the above data the compositions of the present invention restore the appearance of the pitted top coat.

The test hood was left outdoors exposed to environmental conditions for one month and re-evaluated for appearance. The following table outlines the results of that evaluation;

| Composition Example Number | Rating |
|---|---|
| None | 0 |
| 14 | 4 |
| 17 | 4 |
| 18 | 3 |
| 21 | 4 |
| 22 | 3 |
| 25 | 3 |
| 27 | 4 |
| 30 | 5 |
| 35 | 4 |
| 39 | 3 |

What is claimed is:
1. A process for restoring painted surfaces to which has been applied a clear top coat which comprises contacting the surface with an effective amount of a reactive composition which comprises;
  (a) a silanic hydrogen containing silicone polymer conforming to the following structure;

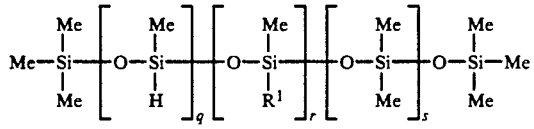

wherein;
$R^1$ is selected from lower alkyl having one to eight carbon atoms and phenyl;
q is an integer from 1 to 1,000;
r and s are independently integers from 0 to 1,000;
Me is methyl;
  (b) an organic solvent selected from mineral spirits, kerosene, d limonene and 1,1,1 trichloroethane;
and optionally
  (c) a catalyst containing tin, zirconium and titanium.
2. The process of claim 1 wherein the percentage of silanic hydrogen containing polymer ranges from 90% to 2%.
3. The process of claim 1 wherein the percentage of solvent ranges from 10% to 98%.
4. The process of claim 1 wherein the percentage of catalyst may range from 0% to 10%.
5. The process of claim 1 wherein R1 is phenyl.

* * * * *